United States Patent [19]

Rhoades

[11] 4,180,535
[45] Dec. 25, 1979

[54] METHOD OF BONDING PROPELLANTS CONTAINING MOBILE CONSTITUTENTS

[75] Inventor: Richard G. Rhoades, Huntsville, Ala.

[73] Assignee: The United States of America as represented by the Secretary of the Army, Washington, D.C.

[21] Appl. No.: 939,760

[22] Filed: Sep. 5, 1978

[51] Int. Cl.² .......................................... C06B 21/00
[52] U.S. Cl. .................................... 264/3 R; 86/1 R; 102/103
[58] Field of Search ......................... 86/1 R; 102/103; 264/3 R

[56] References Cited

U.S. PATENT DOCUMENTS

| 3,083,610 | 4/1963 | Lancy | 102/103 X |
| 3,507,114 | 4/1970 | Webb | 102/103 X |
| 3,928,965 | 12/1975 | MacBeth | 102/103 X |
| 3,943,208 | 3/1976 | Ratte et al. | 264/3 R |
| 4,004,523 | 1/1977 | Clifford et al. | 102/103 |
| 4,092,186 | 5/1978 | Gordon et al. | 102/103 X |

Primary Examiner—Leland A. Sebastian
Attorney, Agent, or Firm—Nathan Edelberg; Robert P. Gibson; Jack W. Voigt

[57] ABSTRACT

An element of a strong bond system between propellants containing mobile constituents such as carboranes, ferrocenes, or nitroglycerin and composite (fiber/resin) cases is provided by coating the insulated (or uninsulated) case with metal that is etched or abraded after the metal is deposited by flame spraying or vapor deposition. The propellant is then cast upon the etched or abraded metal surface which functions as a barrier to migration of the mobile constituents as well as a part of the bond system.

7 Claims, 3 Drawing Figures

METHOD OF BONDING PROPELLANTS CONTAINING MOBILE CONSTITUTENTS

DEDICATORY CLAUSE

The invention described herein may be manufactured, used, and licensed by or for the Government for governmental purposes without the payment to me of any royalties thereon.

BACKGROUND OF THE INVENTION

Various methods have been employed to obtain high burning rate propellants. The method selected has to be suited for the type propellant, burning time required, and motor design.

The prior art use of liquid burning rate catalysts (particularly of the organoiron or carborane types) has resulted in problems associated with the use of such catalysts because of their relatively high volatility, their high freezing points, and their tendencies to migrate within the propellant and into the liner and insulation of the rocket. In order to overcome these migratory tendencies, it has been necessary (in one technique to overcome the migratory tendencies) to incorporate high percentages of burning rate promoter into the insulation to produce a near-equilibrium situation insofar as catalyst migration is concerned, thus further complicating the manufacture of these types of solid rocket motors. This technique to hinder catalyst migration did not prove to be a solution to catalyst migration.

Other approaches have been made toward solving the problems associated with catalyst migration, particularly in several propellants under active development which contain appreciable amounts of liquid burning rate additives such as those of the ferrocene and carborane type. These additives which have been determined to be extremely mobile will migrate into the liner, insulation, or motor case (if the case is of the composite-fiber/resin type), and as a result of additive migration, ballistic anomalies or catastrophies have often resulted.

Carborane type propellants containing carboranyl methyl ethyl sulfide (CMES), carboranyl methyl propyl sulfide (CMPS), mixtures of CMES/CMPS, normal hexylcarborane (NHC), and carboranyl methyl proprionate (CMP) bond well to metal motor cases that have been grit blasted and degreased. Thus, their use in this combination does not relate to the additional problems associated with penetration of case and/or liner materials by a carboranyl catalyst.

Carborane propellants of the types described above are of particular interest for use in composite motor cases (glass fiber/epoxy resin or graphite/epoxy resin) under high lateral and axial loading conditions; i.e., conditions that require excellent bond strength between the propellant/liner/insulation/case system. The migration of catalyst problem associated with carborane propellants used in composite motor cases has been lessened by a partially satisfactory propellant/liner/case bond system by using aluminum foil bonded to the propellant on one side and to a liner on the other side. The technique was earlier used in combination with a metal case, and the liner and propellant with aluminum foil between the liner and propellant is bonded to the metal case. The problem associated with the aluminum foil technique which was used on the joint US-Canada Metrocket Program include "pinholes" in the foil and cracking/tearing of the foil if the grain exterior geometry is complicated.

Advantageous would be a combination which can utilize the good bonding characteristic of propellants of the carborane type to bare metal and eliminate the problems encountered with foil.

Therefore an object of this invention is to provide a method of bonding propellants containing carborane, ferrocene, or nitroglycerin to a metal barrier to prevent migration into the liner, insulation, or composite motor case.

Another object of this invention is to provide a method of bonding propellants containing carborane, ferrocene, or nitroglycerin to a metal barrier to prevent migration into the liner, insulation, or composite motor case having complex case geometries.

SUMMARY OF THE INVENTION

A technique which will take advantage of the demonstrated good bonding of propellants of the carborane or ferrocence type to base metal and eliminate the problems encountered with foil as disclosed in accordance with this invention is as follows:

A thin coating of a metal is flame sprayed or vapor deposited on the surface to which it is desired to bond the propellant containing a mobile additive of ferrocene, carborane, or nitroglycerin. The deposited metal may be steel, aluminum, or other metal that can be flame sprayed or vapor deposited on the composite case directly or on the insulation or insulation/liner layer where loading and thermal/erosion conditions dictate. This metal coating or film can then be etched or abraded if necessary to improve bonding when the propellant is cast on it. The net result is a good bond system with a metal barrier to additive migration into the liner, insulation, or case - and a system capable of being used with complex case geometries.

DESCRIPTION OF THE PREFERRED EMBODIMENT

The method of this invention employs a technique which provides a metal barrier to migration of mobile constituents such as carboranes, ferrocenes, and nitroglycerine of solid propellants. The metal barrier is a thin coating of a metal that is flame sprayed or vapor deposited on the surface to which it is desired to bond the propellant containing a mobile additive of carborane, ferrocene, or nitroglycerin. The deposited metal may be steel, aluminum, or other metal that can be flame sprayed or vapor deposited on the composite case of a rocket motor directly or on the insulation or insulation/liner layer of a composite case of the fiber/resin type for a rocket motor. The metal coating or film can then be etched or abraded to provide a roughened surface to promote better propellant bonding thereto. The propellant is then cast and cured to the metal coating. The results achieved include a good bond system with a metal barrier to mobile constituent migration into the liner, insulation, or case of the rocket motor. This method can be used with complex case geometries.

Figure 1:
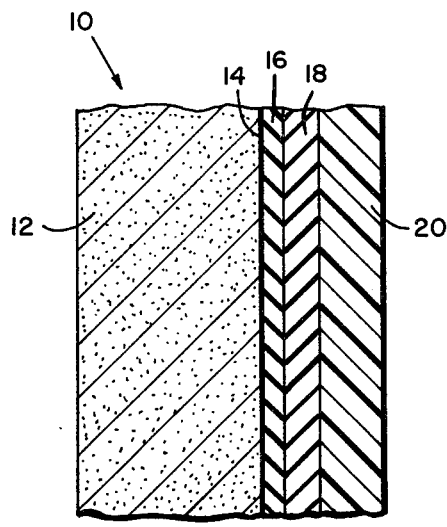
FIG. 1 of the drawing shows a partial sectional view of a rocket motor 10 comprised of a composite case with insulation, liner, and a sprayed or deposited metal film with a propellant grain bonded thereto which contains a mobile additive of carborane, ferrocene or nitroglycerin.

In further reference to the drawing, FIG. 1 depicts a partial sectional view of a rocket motor 10 wherein a propellant 12 containing a carborane, ferrocene, or nitroglycerine additive is shown bonded to a metal film 14. The metal film is shown deposited onto a liner material 16 which is bonded to insulation material 18. The insulation material is bonded to a composite case 20. The liner and insulation materials are optional; therefore, for many rocket motor embodiments which do not require liner or insulation materials the propellant is bonded to a metal film deposited directly onto the composite case of the rocket motor.

Figure 2:
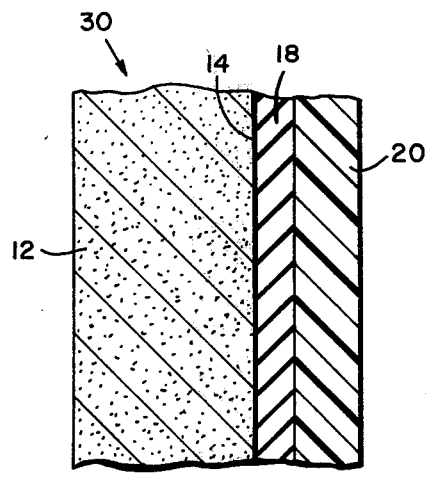
FIGS. 2 and 3 show similar views of other embodiments made in accordance with the method of this invention wherein the propellant is bonded to the metal barrier which is bonded to insulation and the composite case respectively.

FIG. 2 of the drawing shows a partial sectional view of a rocket motor 30 wherein the propellant 12 is cast onto a metal film 14 which has been deposited to insulation 18 which is bonded to the composite case 20.

Figure 3:
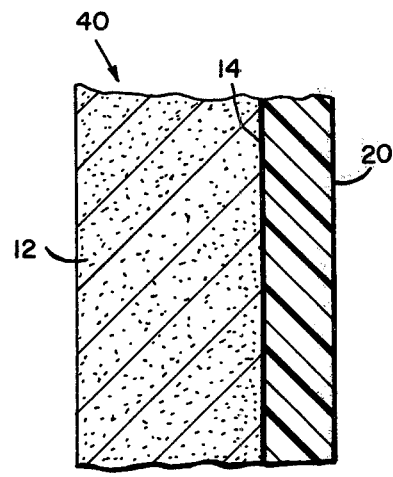

FIG. 3 of the drawing shows a partial sectional view of a rocket motor 40 wherein the propellant 12 is cast onto a metal film 14 which has been deposited to the composite case 20.

The metal film of minimum thickness which provides coverage of the substrate material (liner, insulation, or composite case) should be etched or abraded to improve bonding of the propellant to the metal film when the propellant is cast onto the liner, insulation, or composite case and cured in accordance with established techniques in the solid propellant rocket motor art. The cured propellant grain that is bonded to the metal film is securely held to the substrate material (liner, insulation, or composite case). The metal film provides a barrier to prevent migration of mobile constituents from the propellant composition into the liner, insulation, or composite case. The substrate, if liner, would generally include optional insulation between liner and composite case. The substrate, if insulation, would include composite case. The substrate, if composite case only would not include the optional liner and insulation material.

I claim:

1. A method of bonding propellants containing mobile constituents to a substrate to achieve the formation of an element of a strong bond system which additionally functions as a barrier to migration of said mobile constituents, said method comprising:
   (i) providing a substrate material selected from the group of substrate materials consisting of a composite case of the fiber/resin type for a rocket motor, insulation material bonded to a composite case of the fiber/resin type for a rocket motor, and a liner material bonded to insulation material which is bonded to a composite case of the fiber/resin type for a rocket motor;
   (ii) forming a metallic film of a metal by flame spraying or vapor depositing said metal on said substrate material onto which an uncured propellant is to be subsequently cast;
   (iii) abrading said metallic film to provide a roughened surface to promote bonding of propellant to be cast onto said metallic film;
   (iv) casting onto said metallic film an uncured propellant composition containing mobile constituents selected from the group consisting of carboranes, ferrocenes, and nitroglycerin; and
   (v) curing said cast propellant composition to form a propellant grain that is bonded to said metallic film which serves as an element of a strong bond system and a barrier to migration of said mobile constituents to said substrate material.

2. The method of claim 1 wherein said substrate material selected is a composite case of the fiber/resin type for a rocket motor; and wherein said metallic film is formed of steel.

3. The method of claim 1 wherein said substrate material selected is a composite case of the fiber/resin type for a rocket motor; and wherein said metallic film is formed of aluminum.

4. The method of claim 1 wherein said substrate material selected is insulation material bonded to a composite case of the fiber/resin type for a rocket motor; and wherein said metallic film is formed of steel.

5. The method of claim 1 wherein said substrate material selected is insulation material which is bonded to a composite case of the fiber/resin type for a rocket motor; and wherein said metallic film is formed of aluminum.

6. The method of claim 1 wherein said substrate material selected is a liner material bonded to insulation material which is bonded to a composite case of the fiber/resin type for a rocket motor; and wherein said metallic film is formed of steel.

7. The method of claim 1 wherein said substrate material selected is a liner material bonded to insulation material which is bonded to a composite case of the fiber/resin type for a rocket motor; and wherein said metallic film is formed of aluminum.

* * * * *